United States Patent
Suzuki (10) Patent No.: US 8,797,143 B2
(45) Date of Patent: Aug. 5, 2014

(54) INFORMATION PROCESSING APPARATUS

(75) Inventor: Shigeaki Suzuki, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 274 days.

(21) Appl. No.: 13/006,673

(22) Filed: Jan. 14, 2011

(65) Prior Publication Data

US 2011/0175709 A1 Jul. 21, 2011

(30) Foreign Application Priority Data

Jan. 18, 2010 (JP) ................................. 2010-008537

(51) Int. Cl.
*H04Q 5/22* (2006.01)
*G08B 1/08* (2006.01)
*G08B 13/14* (2006.01)
*H04B 7/00* (2006.01)
*H04B 17/00* (2006.01)
*G06K 5/00* (2006.01)

(52) U.S. Cl.
USPC .................... 340/10.1; 340/10.3; 340/539.12; 340/539.32; 340/571; 455/41.2; 455/67.13; 235/380

(58) Field of Classification Search
CPC ............. G06K 3/00; G06K 3/02; G06K 9/00; G06K 9/00456; G06K 2009/00442; G06K 7/0095; G06K 7/0008; G06K 7/00006; G06K 9/36; G06K 9/58; G06K 9/80; G06K 2007/00; G06K 2007/10524; G06K 2009/20; G06K 2009/00; G06K 2009/00489; G06K 2009/015; G06K 19/0723; H04W 68/00; H04W 68/06; H04W 12/06; H04W 40/00; H04W 60/04; H04W 88/02; G07C 2209/02; G07C 2209/14; G07C 2209/00; G06Q 2220/10; G06Q 2220/16

USPC ........ 340/10.1, 10.3, 572.1, 825.36, 825.49, 340/10.33, 505, 10.51, 539.22, 568.1, 340/539.32, 691.3; 455/41.2, 421, 44.1, 455/41.3, 46; 235/492, 382, 384
See application file for complete search history.

(56) References Cited

U.S. PATENT DOCUMENTS 6,297,737 B1 * 10/2001 Irvin .............................. 340/571
2004/0217859 A1 * 11/2004 Pucci et al. ............... 340/539.32
(Continued)

FOREIGN PATENT DOCUMENTS

JP 2003-168083 6/2003
JP 2005-195341 7/2005
(Continued)

OTHER PUBLICATIONS

Japanese Office Action for Japanese Application No. 2010-008537 mailed on Dec. 6, 2011.

*Primary Examiner* — Jennifer Mehmood
*Assistant Examiner* — Mirza Alam
(74) *Attorney, Agent, or Firm* — Amin, Turocy & Watson, LLP (57) ABSTRACT

An information processing apparatus according to an embodiment includes a communication control unit controlling communication of a radio communication device with a data carrier transmitting a signal including communication distance information regarding a communication distance; an output variable control unit varying transmission output of the radio communication device; and a data carrier determination unit determining that the data carrier having a short communication distance is valid as the transmission output is large, and determining that the data carrier having a long communication distance is valid as the transmission output is small.

6 Claims, 6 Drawing Sheets

(56) References Cited

U.S. PATENT DOCUMENTS

| | | |
|---|---|---|
| 2006/0128503 A1* | 6/2006 | Savarese et al. ............... 473/353 |
| 2006/0220793 A1* | 10/2006 | Park et al. .................... 340/10.3 |
| 2009/0140842 A1 | 6/2009 | Suzuki |
| 2009/0146788 A1 | 6/2009 | Suzuki |
| 2009/0201166 A1 | 8/2009 | Itagaki et al. |
| 2009/0325489 A1* | 12/2009 | Kawahara ................... 455/41.2 |
| 2010/0243731 A1* | 9/2010 | Sawada et al. ................ 235/380 |
| 2011/0117859 A1* | 5/2011 | Tanaka et al. .............. 455/67.13 |

FOREIGN PATENT DOCUMENTS

| | | |
|---|---|---|
| JP | 2007072681 | 3/2007 |
| JP | 2008-211335 | 9/2008 |
| JP | 2008-234374 | 10/2008 |
| WO | 2006/106579 A1 | 10/2006 |
| WO | 2007/026888 A1 | 3/2007 |

* cited by examiner

| COMMUNICATION DISTANCE INFORMATION | COMMUNICATION DISTANCE |
|---|---|
| 00 | LESS THAN 50 cm |
| 01 | EQUAL TO OR LARGER THAN 50 cm TO LESS THAN 150 cm |
| 10 | EQUAL TO OR LARGER THAN 150 cm TO LESS THAN 500 cm |
| 11 | EQUAL TO OR LARGER THAN 500 cm |

FIG.9

INFORMATION PROCESSING APPARATUS

CROSS-REFERENCE TO RELATED APPLICATION

This application claims the benefit of Japanese Patent Application No. 2010-008537, filed Jan. 18, 2010, the content of which is incorporated herein by reference.

FIELD

Embodiments described herein relate generally to an information processing apparatus.

BACKGROUND

In a known goods sale system, a POS (Point Of Sale) terminal registers data regarding goods using the RFID (Radio Frequency Identification) technique.

In the goods sale system using the RFID technique, it is difficult to enlarge a RFID tag as a data carrier attached on relatively small-sized goods such as accessories. Therefore, a relatively small-sized RFID tag having a small antenna and a short communication distance is attached to the relatively small-sized goods. In contrast, a large-sized RFID tag for a large antenna and a long communication distance is attached to relatively large-sized goods such as suits. Therefore, in the goods sale system using a RFID technique according to a related art, RFID tags having different communication distances coexist.

When data carriers such as a plurality of RFID tags for different communication distances coexist and transmission output from a radio communication device communicating with the data carriers is large, both the data carrier for a short communication distance and the data carrier for a long communication distance respond. Therefore, it is difficult to specify the data carrier which is a given communication target.

DETAILED DESCRIPTION

An information processing apparatus according to an embodiment includes a communication control unit controlling communication of a radio communication device with a data carrier transmitting a signal including communication distance information regarding a communication distance; an output variable control unit varying transmission output of the radio communication device; and a data carrier determination unit determining that the data carrier having a short communication distance is valid as the transmission output is large, and determining that the data carrier having a long communication distance is valid as the transmission output is small.

A storage medium according to an embodiment stores a program executing a computer as: a communication control unit controlling communication of a radio communication device with a data carrier transmitting a signal including communication distance information regarding a communication distance; an output variable control unit varying transmission output of the radio communication device; and a data carrier determination unit determining that the data carrier having a short communication distance is valid as the transmission output is large, and determining that the data carrier having a long communication distance is valid as the transmission output is small.

A data carrier according to an embodiment includes a memory storing communication distance information regarding a communication distance; and an antenna transmitting a signal including the communication distance information.

Figure 1:
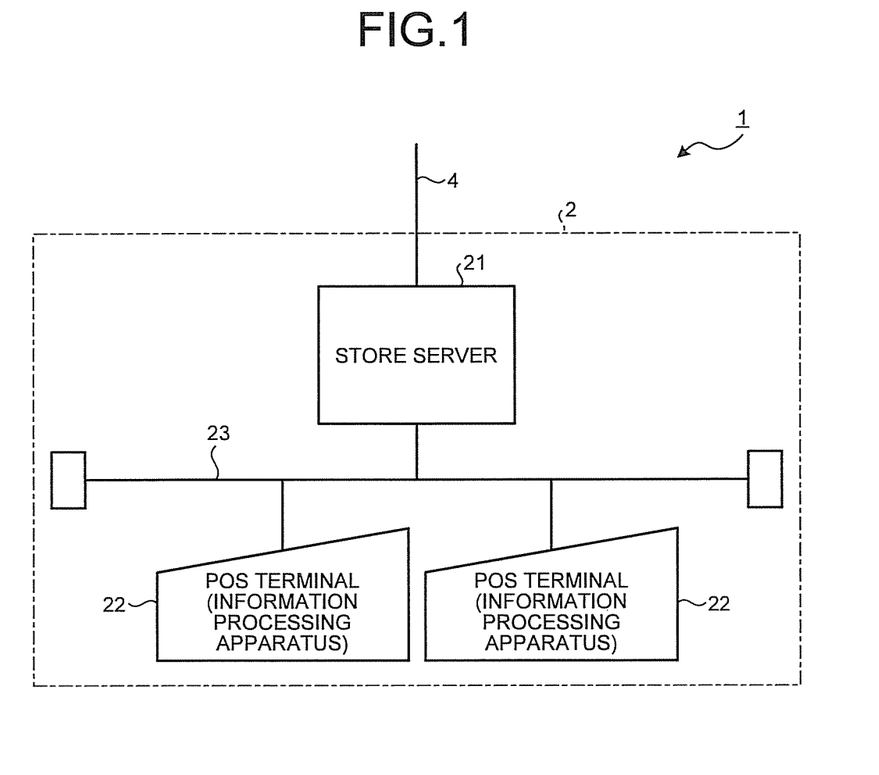
FIG. 1 is a schematic diagram illustrating the configuration of a goods sale system serving as an information processing system according to an embodiment.

As shown in FIG. 1, a goods sale system 1 serving as an information processing system according to this embodiment includes a store system 2. The store system 2 is connected to another apparatus (for example, a headquarters system (not shown) of a POS (Point Of Sale)) via an electric communication line 4 such as a public network or an internet VPN (Virtual Private Network).

The store system 2 includes a store server 21 serving as a computer in charge of a main system and POS terminals 22 serving as a goods sale terminal apparatus. The store server 21 and the POS terminals 22 are connected to each other via an electric communication line 23 such as a LAN (Local Area Network). In this embodiment, the POS terminal 22 corresponds to an information processing apparatus.

Figure 2:
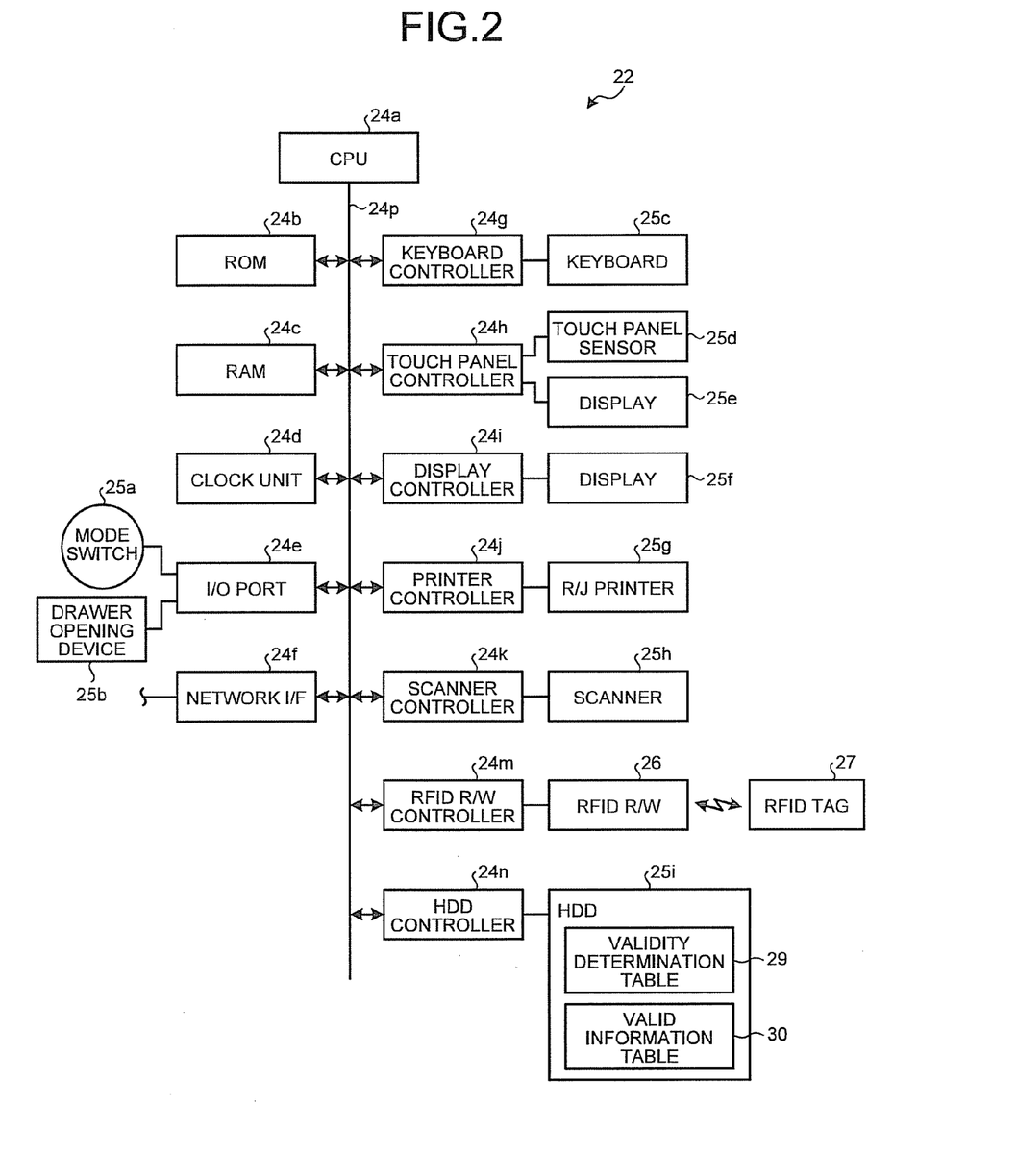
FIG. 2 is a schematic diagram illustrating the configuration of a POS terminal serving as an information processing apparatus according to the embodiment.

As shown in FIG. 2, the POS terminal 22 includes a CPU (Central Processing Unit) 24a, a ROM (Read Only Memory) 24b, a RAM (Random Access Memory) 24c, a clock unit 24d, an I/O (Input/Output) port 24e, a network interface 24f, a keyboard controller 24g, a touch panel controller 24h, a display controller 24i, a printer controller 24j, a scanner controller 24k, an RFID reader and writer controller 24m, and a hard disk controller 24n. As shown in FIG. 2, the above units are connected to each other via a bus line 24o such as an address bus or a data bus.

Figure 3:
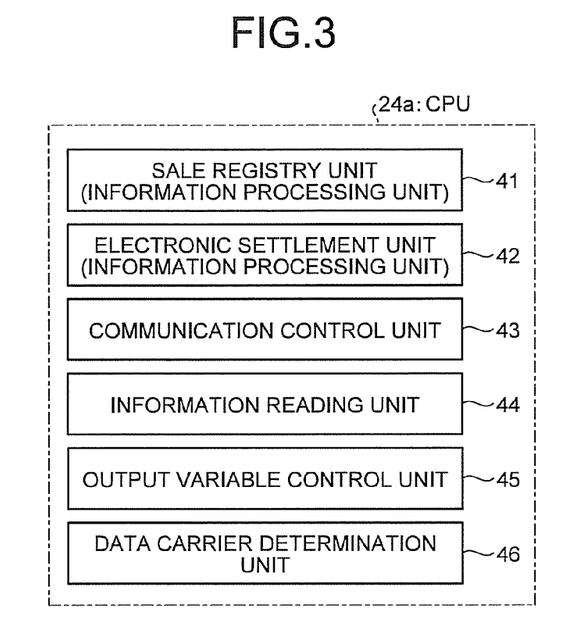
FIG. 3 is a schematic diagram illustrating the configuration of a CPU of the POS terminal according to the embodiment.

The CPU 24a executes various computer-readable programs stored in the ROM 24b and controls the POS terminal 22. The ROM 24b stores various programs executed by the CPU 24a or various data. The RAM 24c temporarily stores data or programs when the CPU 24a executes various programs. In this embodiment, a program for the POS terminal 22 includes a module executing sales and registry, a module executing electronic settlement, a module executing communication control, a module reading information included in a received signal, a module variably controlling output transmitted from a RFID reader and writer 26, and a module determining a valid data carrier. As shown in FIG. 3, the CPU 24a operates as a sale registry unit 41, an electronic settlement unit 42, a communication control unit 43, an information reading unit 44, an output variable control unit 45, a data carrier determination unit 46, and the like according to the program. The program is stored in various storage media.

The clock unit 24d measures current date and time. The network interface 24f controls data communication with other apparatuses connected via the electronic communication lines 23 and 4. The I/O port 24e receives a mode selection signal from a mode switch 25a. The I/O port 24e outputs a driving signal to a drawer opening device 25b automatically opening a drawer (not shown). The keyboard controller 24g receives a key signal corresponding to an operated key of a keyboard 25c and notifies the CPU 24a of the key signal. The touch panel controller 24h controls a touch-panel attached display 25e for customers and allows the display 25e to colorfully display characters or the like corresponding to display data supplied from the CPU 24a. The touch panel controller 24h receives a signal from a touch panel sensor 25d mounted on the screen of the display 25e and notifies the CPU 24a of the signal. The display controller 24i controls an operator display 25f and colorfully displays characters corresponding to display data given from the CPU 24a. The printer controller 24j controls driving of an R/J printer 25g and allows the R/J printer 25g to print a receipt or a journal based on print data supplied from the CPU 24a. The scanner controller 24k receives a signal of data read by a scanner 25h and inputs the signal into the CPU 24a.

The RFID reader and writer controller 24m receives an instruction signal from the CPU 24a. The RFID reader and writer controller 24m outputs a signal to control the RFID reader and writer 26 for a RFID tag 27 serving as a data carrier. The RFID reader and writer 26 operates as an RFID reader or an RFID writer based on a received signal. That is, the RFID reader and writer 26 reads data from the RFID tag 27 or writes data into the RFID tag 27. Moreover, the RFID reader and writer 26 notifies the CPU 24a of the read data.

The hard disk controller 24n operates based on an instruction signal from the CPU 24a. That is, the hard disk controller 24n reads data from a hard disk 25i or writes data into the hard disk 25i. The hard disk 25i has a storage area such as a validity determination table 29 or a valid information table 30 as well as all data regarding the system. The validity determination table 29 includes validity determination information used to determine the RFID tag 27 serving as a valid data carrier. The valid information table 30 includes data of the RFID tag 27 determined to be valid.

Figure 4:
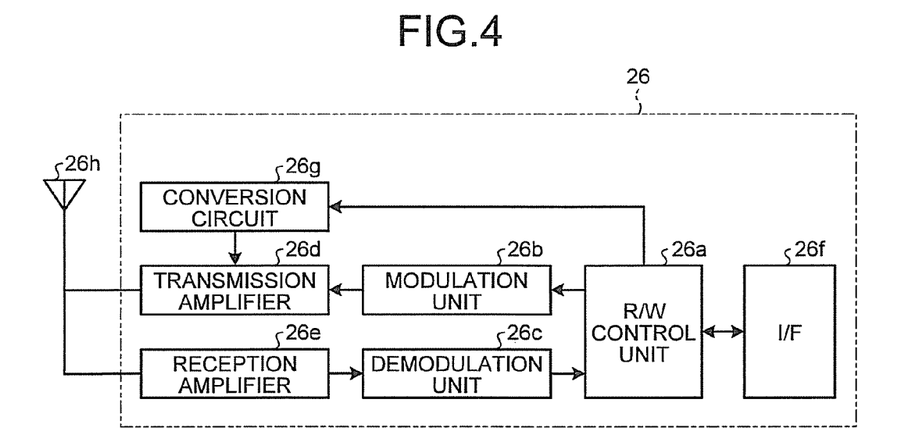
FIG. 4 is a schematic diagram illustrating the configuration of an RFID reader and writer serving as a radio communication device according to the embodiment.

As shown in FIG. 4, the RFID reader and writer 26 includes a reader and writer control unit 26a, a modulation unit 26b, a demodulation unit 26c, a transmission amplifier 26d, a reception amplifier 26e, an interface unit 26f, a conversion circuit 26g, and an antenna 26h. The reader and writer control unit 26a controls an operation of the RFID reader and writer 26. The modulation unit 26b modulates transmission data received from the reader and writer control unit 26a. The transmission amplifier 26d amplifies the radio waves modulated in the modulation unit 26b and radiates the amplified radio waves from the antenna 26h. The reception amplifier 26e amplifies the radio waves received by the antenna 26h. The demodulation unit 26c demodulates the radio waves amplified by the reception amplifier 26e. The interface unit 26f communicates data with the CPU 24a. The conversion circuit 26g has a D/A conversion function of converting digital signals from the CPU 24a into analog signals (current value). The transmission amplifier 26d includes a power amplifier that converts transmission output (transmission power) according to the analog signals (current value) from the conversion circuit 26g.

Figure 5:
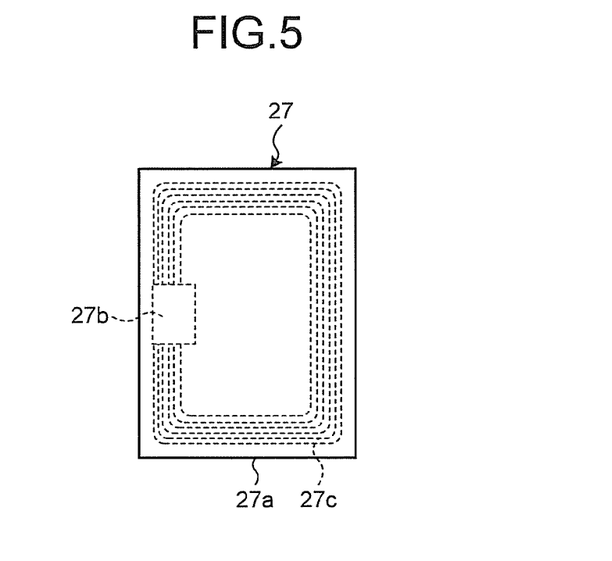
FIG. 5 is a schematic diagram illustrating the configuration of an RFID tag serving as a data carrier according to the embodiment.

As shown in FIG. 5, the RFID tag 27 serving as a data carrier includes an IC (Integrated Circuit) chip 27b and an antenna 27c inside a coating body 27a formed of a case or a cover. The IC chip 27b is an electronic circuit component that includes a power generation unit, a demodulation unit, a modulation unit, a memory 28 (see FIG. 6), and a control unit controlling the power generation unit, the demodulation unit, the modulation unit, and the memory. The power generation unit rectifies and stabilizes the radio waves received by the antenna 27c and supplies power to each unit of the IC chip 27b. The demodulation unit demodulates the radio waves received by the antenna 27c and transmits the demodulated radio waves to the control unit. The modulation unit modulates the data transmitted from the control unit into radio waves and radiates the modulated radio waves from the antenna 27c. The control unit controls writing the data demodulated by the demodulation unit into the memory 28 and transmitting the data read from the memory 28 to the modulation unit. The RFID tag 27 having the above-described configuration functions as a data carrier that transmits signals including the data stored in the memory 28 according to the signals received from the RFID reader and writer 26 serving as a radio communication device.

Figures 6, 7:
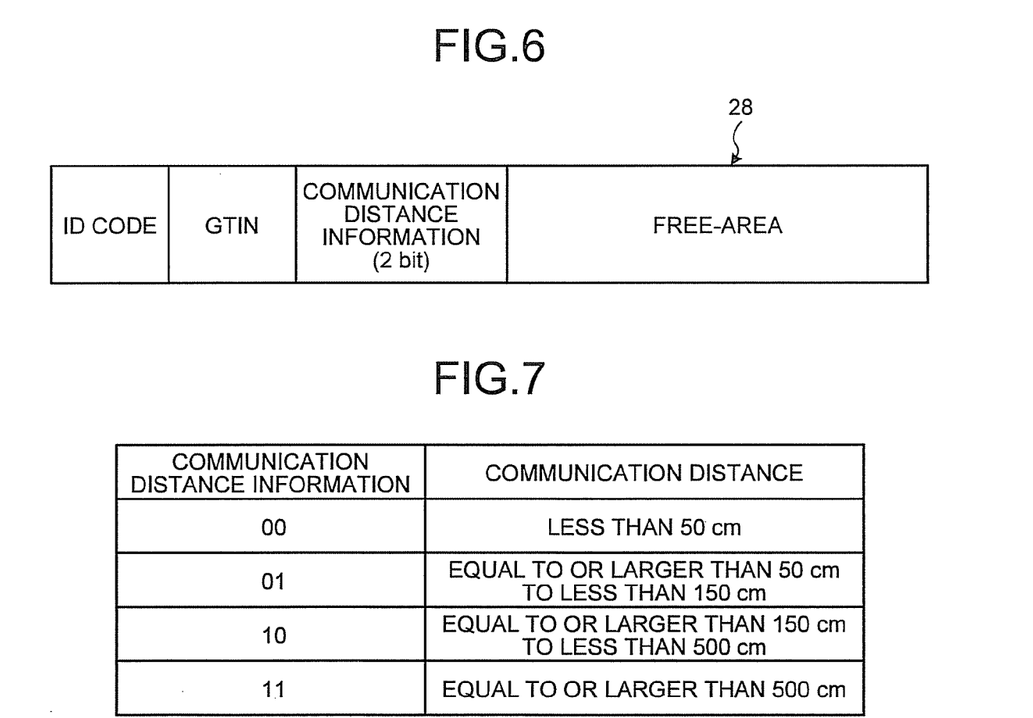
FIG. 6 is a schematic diagram illustrating an example of data stored in the RFID tag according to the embodiment.
FIG. 7 is a table showing a setting example of communication distance information representing a communication distance of the RFID tag according to the embodiment.

As shown in FIG. 6, the memory 28 includes an area storing a unique ID code (serial number) of the RFID tag 27, an area storing a goods identification code such as GTIN (Global Trade Item Number), an area storing communication distance information, and a free-area.

The communication distance information is information representing a communication distance (for example, a read distance when 1 W is output) of the RFID tag 27. In this embodiment, the communication distance information has 2 bits. Specifically, the communication distance information shown in FIG. 7 as an example is classified into a plurality of types of information (in this embodiment, four types) according to the length of the communication distance. That is, when the communication distance is less than 50 cm, the communication distance information is "00". When the communication distance is equal to or larger than 50 cm and less than 150 cm, the communication distance information is "01". When the communication distance is equal to or larger than 150 cm and less than 500 cm, the communication distance information is "10". When the communication distance is equal to or larger than 500 cm, the communication distance information is "11".

Figure 8:
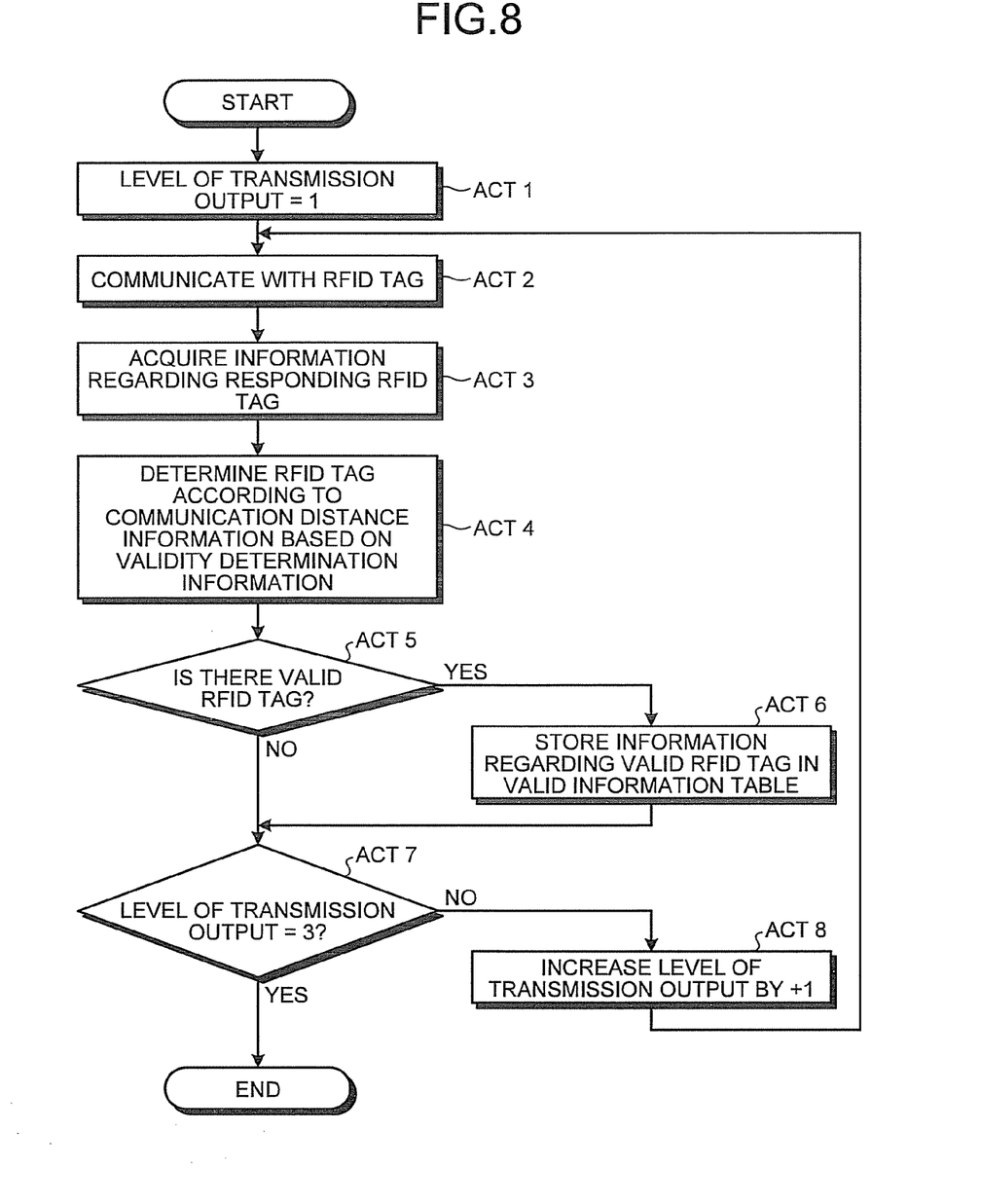
FIG. 8 is a flowchart illustrating exemplary order in which the POS terminal determines a valid RFID tag according to the embodiment.

Next, referring to FIG. 8, the determination process of the RFID tag 27 is displayed by the POS terminal 22 serving as the information processing apparatus. In the flow of FIG. 8, the CPU 24a of the POS terminal 22 determines the valid RFID tag 27.

Figure 9:
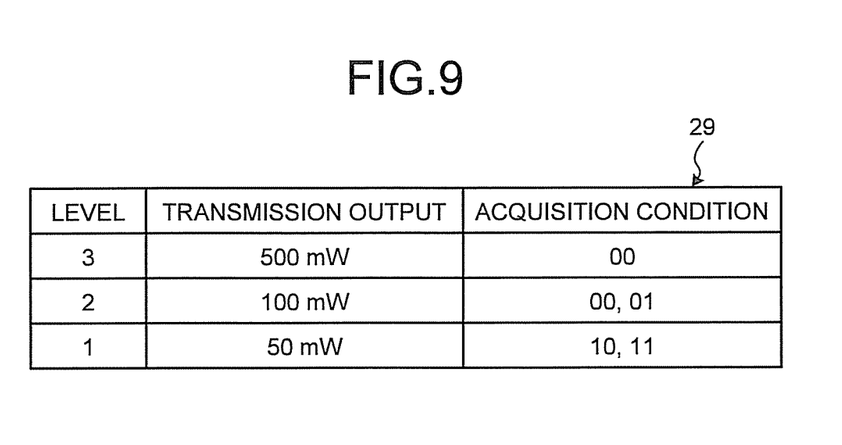
FIG. 9 is a table showing an example of a validity determination table as validity determination information according to the embodiment.

First, the CPU 24a sets the level of the transmission output of the RFID reader and writer 26 to "1" (Act 1). In this embodiment, as shown in FIG. 9, the level of the transmission output of the RFID reader and writer 26 is classified into a plurality of types (in this embodiment, three types) according to the strength thereof. When the level is "1", the transmission output of the RFID reader and writer 26 is set to 50 mW. When the level is "2", the transmission output of the RFID reader and writer 26 is set to 100 mW. When the level is "3", the transmission output of the RFID reader and writer 26 is set to 500 mW. In Act 1, the CPU 24a operates as the output variable control unit 45 (see FIG. 3) and notifies at least the RFID reader and writer controller 24m of the level of the transmission output. The CPU 24a controls the transmission amplifier 26d through the RFID reader and writer controller 24m, the interface unit 26f, the reader and writer control unit 26a, and the conversion circuit 26g. Accordingly, the transmission output of the RFID reader and writer 26 is set to a value corresponding to the notified level. In Act 1, the CPU 24a may transmit data representing the level to the RFID reader and writer 26 or may transmit data representing the value of the transmission output.

Then, the CPU 24a operates as the communication control unit 43 (see FIG. 3) and communicates with the RFID tag 27 (Act 2). In Act 2, the communication control unit 43 first controls the RFID reader and writer 26 and outputs the signal to the RFID reader and writer 26. The transmission output of the signal in Act 2 is performed with a value set in Act 1 or Act 8 described below. After Act 1, the level is "1". Therefore, as shown in FIG. 9, the transmission output is 50 mW. After Act 8, the transmission output corresponding to the level in FIG. 9 is set.

The RFID tag 27 receiving the signal from the RFID reader and writer 26 transmits a response signal. When the RFID reader and writer 26 is present within a communication range of the RFID tag 27, the RFID reader and writer 26 receives a signal from the RFID tag 27. Thus, the RFID reader and writer 26 communicates with the RFID tag 27. In Act 2, according to an anti-collision process of a timeslot scheme or the like, the RFID reader and writer 26 can receive the signal from a plurality of the RFID tags 27.

Next, the CPU 24a operates as the information reading unit 44 (see FIG. 3) and acquires information included in a signal from the signal acquired from the responding. RFID tag (Act 3). The information acquired from the RFID tag 27 includes the ID code, the GTIN, the communication distance information, and information stored in the free-area described above. When the RFID reader and writer 26 receives the response signal from the plurality of RFID tags 27, Act 3 and Act 4 are sequentially executed for all the plurality of RFID tags 27.

Next, the CPU 24a operates as the data carrier determination unit 46. That is, the CPU 24a refers to the validity determination table 29 (see FIGS. 2 and 9) representing the validity determination information. And the CPU 24a determines whether the responding RFID tag 27 is valid, according to the communication distance represented by the communication distance information acquired in Act 3 (Act 4).

In this embodiment, conditions (acquisition conditions) which are determined by the data carrier determination unit 46 to be valid, as illustrated in FIG. 9, are different according to the level of the transmission output. Specifically, in the example of FIG. 9, if the level of the transmission output is "1" (that is, if the transmission output is 50 mW), the CPU 24a operating as the data carrier determination unit 46 determines that the RFID tag 27 with the communication distance information of "10" and "11" (that is, the RFID tag 27 of which the communication distance is equal to or larger than 150 cm and is less than 500 cm, and the RFID tag 27 of which the communication distance is equal to or larger than 500 cm) is valid, and does not determine that the RFID tag 27 with the communication distance information of "00" and "01" is valid (that is, determines that the RFID tag 27 is invalid).

If the level of the transmission output is "2" (that is, if the transmission output is 100 mW), the CPU 24a operating as the data carrier determination unit 46 determines that the RFID tag 27 with the communication distance information of "00" and "01" (that is, the RFID tag 27 of which the communication distance is less than 50 cm, and the RFID tag 27 of which the communication distance is equal to or larger than 50 cm and less than 150 cm) is valid, and does not determine that the RFID tag 27 with the communication distance information of "10" and "11" is valid (that is, determines that the RFID tag 27 is invalid).

If the level of the transmission output is "3" (that is, if the transmission output is 500 mW), the CPU 24a operating as the data carrier determination unit 46 determines that the RFID tag 27 with the communication distance information of "00" (that is, the RFID tag 27 of which the communication distance is less than 50 cm) is valid, and does not determine that the RFID tag 27 with the communication distance information of "01", "10", "11" is valid (that is, determines that the RFID tag 27 is invalid).

In this manner in the embodiment, in Act 4, when the transmission output of the RFID reader and writer 26 is large, the RFID tag 27 with the short communication distance is valid. If the transmission output of the RFID reader and writer 26 is small, the RFID tag 27 with the long communication distance is valid. If the transmission output of the RFID reader and writer 26 is an intermediate value between the large and small outputs, the RFID tag 27 with the intermediate value between the long and short communication distances is valid. Here, if the RFID tag 27 with the long communication distance is determined to be valid when the transmission output from the RFID reader and writer 26 is large, a valid communication area is expanded by the RFID reader and writer 26. Therefore, the RFID tag 27 that should be originally excluded (determined to be invalid) may be determined erroneously to be valid. On the other hand, if only the RFID tag 27 with the short communication distance is determined to be valid when the transmission output from the RFID reader and writer 26 is small, the valid communication area is reduced by the RFID reader and writer 26. Therefore, the RFID tag 27 that should be originally targeted (determined to be valid) may not be detected. In this embodiment, if the transmission output of the RFID reader and writer 26 is large, the RFID tag 27 with the relatively short communication distance is valid. If the transmission output of the RFID reader and writer 26 is small, the RFID tag 27 with the relatively long communication distance is valid. That is, in this embodiment, it is difficult for the CPU 24a operating as the data carrier determination unit 46 to erroneously determine whether the RFID tag 27 is a given communication target.

Next, if there is the RFID tag 27 determined to be valid in Act 4 by the CPU 24a (Yes in Act 5), the CPU 24a operates as the data carrier determination unit 46 and writes the data of the RFID tag 27 determined to be valid in the valid information table 30 of the hard disk 25i (Act 6). If the plurality of RFID tags 27 is determined to be valid in Act 4, the CPU 24a operating as the data carrier determination unit 46 executes Act 6 for all of the RFID tags 27 determined to be valid.

Next, if there is no RFID tag 27 determined to be valid in Act 4 (No in Act 5) or if the process of Act 6 ends, the CPU 24a operates as the output variable control unit 45 (see FIG. 3). Excluding the case where the level of the transmission output is "3", that is, if the level of the transmission output is equal to or less than "2" (No in Act 7), the CPU 24a increases the level of the transmission level by 1 (Act 8). That is, in Act 8, if the level of the transmission output is "1", the level of the transmission output is changed to "2". In addition, if the level of the transmission output is "2", the level of the transmission output is changed to "3". Then, in Act 8, the RFID reader and writer 26 in Act 2 and the RFID tag 27 communicate with each other at the level of the transmission output set in Act 8.

If the level of the transmission output is "3" (Yes in Act 7), the operation of the flow in FIG. 8 is completed for all the levels of the transmission output.

Thereafter, based on the data of the valid RFID tag 27 stored in the valid information table 30, the sale registry unit 41 (see FIG. 3) executes the registry or the electronic settlement unit 42 (see FIG. 3) executes electronic settlement. For example, the sale registry unit 41 detects a goods ID from data of a bar code of the goods read by the RFID reader and writer 26. For example, the sale registry unit 41 inquires the store server 21 about price data corresponding to the detected goods ID. For example, the sale registry unit 41 generates sale data of the goods based on the received price data and stores (that is, registers) the sale data in the storage unit such as the RAM 24c. For example, the electronic settlement unit 42 totals the sale data, calculates the payment price, and displays the payment price on the display 25e. For example, based on the operation of the operator, the electronic settlement unit 42 allows the POS terminal 22 to prepare for the settlement by an electronic settlement system desired by a customer. Then, the CPU 24a operates a card reader and writer, an IC chip reader and writer (not shown), or the like corresponding to the electronic settlement system desired by a customer, and transmits and receives data necessary for the settlement to and from a card or a terminal. The CPU 24a communicates with an external server or the like and executes the settlement, if necessary. At this time, the electronic settlement unit 42 stores the electronic settlement ID in the storage unit such as the RAM 24c. That is, in this embodiment, the sale registry unit 41 or the electronic settlement unit 42 corresponds to an information processing unit.

As described above, the POS terminal 22 serving as the information processing apparatus according to this embodiment includes the output variable control unit 45 varying the transmission output of the RFID reader and writer 26 serving as the radio communication device and the data carrier determination unit 46 determining that the RFID tag 27 serving as the data carrier with a short communication distance is valid as the transmission output is large. Therefore, erroneous determination whether the RFID tag 27 is a given communication target can be controlled. Thus, for example, the POS terminal 22 can recognize the goods attached with the RFID tag 27 falling within a predetermined range as a processing target more reliably. According to this embodiment, the processing efficiency of the POS terminal 22 can be improved.

In this embodiment, the output variable control unit 45 converts the transmission output of the RFID reader and writer 26 step by step. The data carrier determination unit 46 determines whether the RFID tag 27 is valid, based on the validity determination table 29 representing the validity determination information representing the valid communication distance for the plurality of levels of the transmission output. By classifying the transmission output into the plurality of levels, the data carrier determination unit 46 can execute the determination more easily and more efficiently. For example, users can relatively easily vary the number of classifications or the acquisition conditions (valid conditions) of the classifications by operating an input operation unit such as the keyboard 25c and changing the settings of the validity determination table 29.

In this embodiment, the output variable control unit 45 considerably changes the transmission output step by step. As the transmission output is large, the number of RFID tags 27 serving as the responding data carriers is increased, and thus data processing amount in Act 2 and Act 3 is increased. Accordingly, the output variable control unit 45 changes the small transmission output to the large transmission output and the data carrier determination unit 46 determines whether the RFID tag 27 serving as the data carrier is valid in each state of the transmission output. Therefore, especially when the number (for example, one) of RFID tags 27 serving as the data carrier to be processed is stipulated, the processing efficiency is easily improved.

The invention is not limited to the above-described embodiment, but may be modified in various forms. For example, in this embodiment, the case is described in which the information processing apparatus and the information processing system are constructed using the RFID system. However, the invention can be realized by a radio communication method of using another data carrier.

In this embodiment, the case is described in which the POS terminal 22 is used as the information processing apparatus according to the invention. However, other information processing apparatuses such as a personal computer, a PDA (Personal Digital Assistant), and a handy terminal may be used as the information processing apparatus according to the invention. The information processing apparatus or the radio communication device according to the invention may be configured as a part of the data registry system or the data registry apparatus registering data such as the price of goods for the data carrier attached to goods or the like.

In this embodiment, the case is described in which the CPU 24a of the POS terminal 22 includes all of the communication control unit 43, the information reading unit 44, the output variable control unit 45, and the data carrier determination unit 46. However, the reader and writer control unit 26a (see FIG. 4) of the RFID reader and writer 26 serving as the radio communication device may include the communication control unit 43, the information reading unit 44, the output variable control unit 45, and the data carrier determination unit 46. That is, the information processing apparatus may be configured as a radio communication device. In this case, the RFID reader and writer 26 includes a storage unit (RAM, ROM, NVRAM (Non-Volatile RAM, or the like) not shown in FIG. 4. A program executing the functions of the communication control unit 43, the information reading unit 44, the output variable control unit 45, and the data carrier determination unit 46 is installed in the storage unit (ROM, NVRAM, or the like). The reader and writer control unit 26a uses the storage unit (RAM or the like), when executing the program. The program may be stored in various storage media.

The specification of the data carrier, the information stored in the data carrier, the classification of the communication distance information, the classification of the transmission output, and the correspondence relation (validity determination information) therein are not limited to the above-described embodiment, and may be appropriately modified.

The ordinal number such as first or second of the claims is given for convenience to distinguish the lengths of the communication distances or the strength of the transmission output, and does not indicate the numerals or order.

The information processing apparatus according to this embodiment easily specifies the data carrier as a given communication target.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a communication control unit controlling communication of a radio communication device with a data carrier, the data carrier transmitting to the information processing apparatus a signal including communication range information regarding a communication range of the data carrier;

an output variable control unit varying transmission output of the radio communication device;

a data carrier determination unit determining that when the transmission output is large, the data carrier whose communication range is shorter than a predetermined value is valid and the data carrier whose communication range is equal to or larger than the predetermined value is invalid and that when the transmission output is small, the data carrier whose communication range is larger than a specific value is valid and the data carrier whose communication range is equal to or smaller than the specific value is invalid; and an information processing unit processing information included in the signal received from the data carrier determined to be valid by the data carrier determination unit and not processing information included in the signal received from the data carrier determined to be invalid by the data carrier determination unit.

2. The apparatus according to claim 1, wherein the output variable control unit converts the transmission output step by step, and wherein the validity determination information represents the communication distance which is valid for a plurality of levels of the transmission output.

3. The apparatus according to claim 1, wherein the output variable control unit considerably varies the transmission output step by step.

4. A non-transitory computer readable storage medium storing a program executing a computer as:

a communication control unit controlling communication of a radio communication device with a data carrier, the data carrier transmitting to an information processing apparatus a signal including communication range information regarding a communication range of the data carrier;

an output variable control unit varying transmission output of the radio communication device;

a data carrier determination unit determining that when the transmission output is large, the data carrier whose communication range is shorter than a predetermined value is valid and the data carrier whose communication range is equal to or larger than the predetermined value is invalid and that when the transmission output is small, the data carrier whose communication range is larger than a specific value is valid and the data carrier whose communication range is equal to or smaller than the specific value is invalid; and an information processing unit processing information included in the signal received from the data carrier determined to be valid by the data carrier determination unit and not processing information included in the signal received from the data carrier determined to be invalid by the data carrier determination unit.

5. A data carrier used in the apparatus according to claim 1, wherein the data carrier holds the communication distance information.

6. A radio communication device comprising:

a communication control unit controlling communication of a radio communication device with a data carrier, the data carrier transmitting to the radio communication device a signal including communication range information regarding a communication range of the data carrier;

an output variable control unit varying transmission output of the radio communication device;

a data carrier determination unit determining that when the transmission output is large, the data carrier whose communication range is shorter than a predetermined value is valid and the data carrier whose communication range is equal to or larger than the predetermined value is invalid and that when the transmission output is small, the data carrier whose communication range is larger than a specific value is valid and the data carrier whose communication range is equal to or smaller than the specific value is invalid; and an information processing unit processing information included in the signal received from the data carrier determined to be valid by the data carrier determination unit and not processing information included in the signal received from the data carrier determined to be invalid by the data carrier determination unit.

* * * * *